US007021985B2

(12) United States Patent
Itaya et al.

(10) Patent No.: US 7,021,985 B2
(45) Date of Patent: Apr. 4, 2006

(54) ARC TUBE WITH SHORTENED TOTAL LENGTH, MANUFACTURING METHOD FOR ARC TUBE, AND LOW-PRESSURE MERCURY LAMP

(75) Inventors: Kenji Itaya, Takatsuki (JP); Shiro Iida, Kyoto (JP); Tatsuhiro Yabuki, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/021,797

(22) Filed: Dec. 22, 2004

(65) Prior Publication Data

US 2005/0106985 A1 May 19, 2005

Related U.S. Application Data

(62) Division of application No. 10/456,658, filed on Jun. 5, 2003.

(30) Foreign Application Priority Data

Jun. 12, 2002 (JP) ..................................... 170970

(51) Int. Cl.
*H01J 17/16* (2006.01)
*C03B 23/06* (2006.01)

(52) U.S. Cl. ........................... 445/26; 445/22; 445/25; 313/493

(58) Field of Classification Search ................. 445/22, 445/25–26; 313/493, 634, 635, 573, 318.01, 313/318.02; 362/216; 65/110, 108
See application file for complete search history.

(56) References Cited

U.S. PATENT DOCUMENTS 5,705,883 A 1/1998 Soules et al.
6,064,155 A * 5/2000 Maya et al. .................. 315/56
6,633,128 B1 * 10/2003 Ilyes et al. .................. 313/634

FOREIGN PATENT DOCUMENTS

JP 9-17378 1/1997

* cited by examiner

*Primary Examiner*—Karabi Guharay

(57) ABSTRACT

An arc tube is formed by turning a glass tube at a substantially middle thereof and winding the glass tube from the middle to its both ends around an axis to form a double spiral, and sealing electrodes at both ends of the glass tube. The spiral pitch of a spiral part in a vicinity of one of the ends and an adjacent spiral part in the direction of the axis is set larger than the spiral pitch of other adjacent spiral parts, to widen a gap between the one end and the adjacent spiral part.

8 Claims, 6 Drawing Sheets

ARC TUBE WITH SHORTENED TOTAL LENGTH, MANUFACTURING METHOD FOR ARC TUBE, AND LOW-PRESSURE MERCURY LAMP

RELATED APPLICATION

This application is a divisional application of U.S. Ser. No. 10/456,658, filed on Jun. 5, 2003.

This application is based on an application No. 2002-170970 filed in Japan, the contents of which are hereby incorporated by reference.

BACKGROUND OF THE INVENTION (1) Field of the Invention

The present invention relates to a double-spiral arc tube formed by winding a glass tube into a double spiral, a manufacturing method for the arc tube, and a low-pressure mercury lamp including the arc tube.

(2) Related Art

In the present energy-saving era, a lot of efforts have been made to develop low-pressure mercury lamps. In particular, fluorescent lamps, specifically compact self-ballasted fluorescent lamps that exhibit high luminous efficiency and long life, are calling attentions as light sources alternative to incandescent lamps. Compact self-ballasted fluorescent lamps include arc tubes formed by bending a glass tube and sealing electrodes in the glass tube.

Some of such arc tubes may have a double-spiral structure. As one example, an arc tube with a double-spiral structure may be formed by (a) turning a glass tube at its substantially middle to form a turning part thereof and two spiral parts extending from the turning part to both ends of the glass tube, (b) spirally winding the spiral parts around the same axis, and (c) making end parts of the glass tube substantially parallel with the axis. In such an arc tube, electrodes are inserted and sealed in the end parts of the glass tube that are made substantially parallel with the axis around which the spiral parts are wound (hereafter referred to as the "spiral axis").

Such a double-spiral arc tube has an advantage over an arc tube formed by connecting a plurality of U-shaped glass tubes. The advantage is that the distance between electrodes within the double-spiral arc tube can be made longer than that in the arc tube formed by connecting a plurality of U-shaped glass tubes, assuming both the arc tubes occupy the same predetermined space. Further, a thin glass tube (with a tube outer diameter of about 9 mm) may be employed for forming such a double-spiral arc tube, and a gap between adjacent spirals of the glass tube in the direction of the spiral axis is set at about 1 mm. By doing so, the number of spirals formed around the spiral axis can be increased without increasing the total length of the arc tube. In this way, arc tubes with the distance between electrodes being long can be obtained, thereby enabling compact self-ballasted fluorescent lamps to produce brightness equivalent to brightness produced by incandescent lamps.

Although having been downsized in recent years, conventional compact self-ballasted fluorescent lamps including double-spiral arc tubes are still larger than incandescent lamps. This fact has been an obstacle to the widespread of such compact self-ballasted fluorescent lamps. As a specific example of problems, when a conventional compact self-ballasted fluorescent lamp with its total length being longer than that of an incandescent lamp is set in an existing lighting apparatus designed for an incandescent lamp, the top part of the lamp may protrude from the lighting apparatus.

In view of that, a first conventional technique proposes a compact self-ballasted fluorescent lamp with a shortened total length, i.e., a lamp including an arc tube with a shortened total length. The arc tube is formed by spirally winding a glass tube with the same pitch from its turning part to its end parts without the end parts being made parallel to the spiral axis, and sealing electrodes in the end parts. A second conventional technique proposes a compact self-ballasted fluorescent lamp in which parallel parts (end parts) of a glass tube are not bent in the direction of the spiral axis, but are bent in the inward direction as disclosed in Japanese Laid-open Patent Application No. H9-17378.

According to the first conventional technique, however, parts of the glass tube extending from the turning part to both ends of the glass tube are spirally wound around the spiral axis, and therefore, gaps between (a) end parts of the glass tube and (b) parts of the glass tube adjacent to the end parts in the direction of the spiral axis are as narrow as about 1 mm. Such narrow gaps fail to provide enough work spaces for sealing the electrodes in the end parts, making the operation of sealing electrodes in the end parts difficult. Further, heating the end parts to seal the electrodes therein causes the adjacent parts of the glass tube to be heated as well, thereby causing these adjacent parts to be deformed, or melted and adhered to the end parts of the glass tube. Such deformed arc tubes are treated as defective products.

According to the second conventional technique, the end parts of the glass tube are bent in the inward direction. In this lamp, therefore, gaps between (a) the end parts of the glass tube and (b) parts of the glass tube adjacent to the end parts are not narrowed, unlike in the case of the first conventional technique. However, these inwardly bent end parts are close to each other, failing to provide enough work spaces for sealing electrodes therein. With such small work spaces, the operation of sealing electrodes in the end parts is difficult.

SUMMARY OF THE INVENTION

In view of the above problems, the present invention aims at providing an arc tube that has a shorter total length than conventional arc tubes and that can provide an enough work space for sealing electrodes in end parts of a glass tube, where the conventional arc tubes have end parts of a glass tube extending parallel with the spiral axis. The present invention also aims at providing a manufacturing method for the arc tube, and providing a low-pressure mercury lamp including the arc tube.

The above object of the present invention can be achieved by an arc tube including: a glass tube that is turned at a substantially middle thereof and wound around an axis from the middle to both ends thereof, to have a double-spiral structure; and a pair of electrodes sealed at both the ends of the glass tube, wherein a pitch of (a) a spiral part in a vicinity of one of the ends and (b) an adjacent spiral part in a direction of the axis is set larger than a pitch of other adjacent spiral parts, to widen a gap between the one end and the adjacent spiral part.

It should be noted here that "the direction of the axis" intends to mean a direction parallel with the axis around which the glass tube is wound (hereafter, the "spiral axis"). According to this construction, gaps between (a) the end parts of the glass tube and (b) the parts of the glass tube adjacent to the end parts are widened, thereby for example increasing work spaces for sealing electrodes in the end parts of the glass tube, and also, preventing the parts of the glass tube adjacent to the end parts of the glass tube from being heated to a high temperature when the end parts of the glass tube are heated for the purpose of sealing the electrodes therein.

This enables the electrodes to be sealed in the end parts of the glass tube easily. In addition, as compared with conventional arc tubes in which end parts of a glass tube are made parallel with its spiral axis, the arc tube can be downsized in the direction of the spiral axis, although gaps between (a) the end parts of the glass tube and (b) the parts of the glass tube adjacent to the end parts are larger than gaps between other adjacent parts of the glass tube.

Also, the glass tube of the arc tube may have a bent area provided between (a) a position thereof corresponding to a top of the electrode sealed at the one end and (b) a position thereof away from an end face of the one end by ½ of one spiral formed around the axis, the glass tube being bent at the bent area in the direction of the axis so that a gap between the spiral part in the vicinity of the one end and the adjacent spiral part widens gradually from the bent area toward the one end.

Therefore, the spiral pitch in the end parts of the glass tube can be easily increased.

Further, in the arc tube, a gap between adjacent spiral parts of the glass tube in the direction of the axis, between (a) a position at which the glass tube is turned and (b) a position of the bent area, may be in a range of 0.5 mm or more and less than 3 mm, and the gap between the one end and the adjacent spiral part may be in a range of 3 mm to 12 mm inclusive. Also, in the arc tube, a tube inner diameter of the glass tube may be in a range of 5 mm to 9 mm inclusive.

Therefore, if this arc tube is used for example in a compact self-ballasted fluorescent lamp, the compact self-ballasted fluorescent lamp can have a size substantially the same as the size of an incandescent lamp.

On the other hand, a manufacturing method for an arc tube relating to the present invention is a method for an arc tube formed by turning a glass tube at a substantially middle thereof and winding the glass tube from the middle to both ends thereof around an axis to form a double spiral, and sealing a pair of electrodes at both the ends of the glass tube, the manufacturing method including the steps of: winding the glass tube that is softened by heating, along a groove in a double spiral formed on an outer circumference of a mandrel; removing the glass tube that is wound in a double spiral from the mandrel; making a pitch of (a) a spiral part in a vicinity of a sealing part at each end of the glass tube and (b) an adjacent spiral part in a direction of the axis, larger than a pitch of other adjacent spiral parts, to widen a gap between the sealing part and the adjacent spiral part; and sealing the electrodes in the sealing parts at both the ends of the glass tube.

According to this construction, gaps between (a) the sealing parts of the glass tube and (b) the parts of the glass tube adjacent to the sealing parts are increased, thereby for example increasing work spaces for sealing electrodes in the sealing parts, and also, preventing the parts of the glass tube adjacent to the sealing parts of the glass tube from being heated to a high temperature when the sealing parts of the glass tube are heated to seal the electrodes therein. This enables the electrodes to be sealed in the sealing parts of the glass tube easily.

In addition, as compared with conventional arc tubes in which end parts of a glass tube are made parallel with its spiral axis, the arc tube can be downsized in the direction of the spiral axis, although gaps between (a) the sealing parts of the glass tube and (b) the parts of the glass tube adjacent to the sealing parts are larger than gaps between other adjacent parts of the glass tube.

Further, in the step of making the pitch of the spiral part in the vicinity of the sealing part larger than the pitch of other adjacent spiral parts, a part of the glass tube away from an end face of the sealing part in a winding direction by a predetermined amount of spiral may be heated to a temperature that is higher than a softening point of the glass tube and lower than an operating temperature of the glass tube, and the heated part of the glass tube may be bent in the direction of the axis so that a gap between the spiral part in the vicinity of the sealing part and the adjacent spiral part widens gradually from the heated part toward the sealing part.

Therefore, the spiral pitch in the sealing parts of the glass tube can be easily increased.

Further, in the step of sealing the electrodes, the sealing parts of the glass tube may be heated to a temperature that is equal to or lower than a temperature 120° C. higher than an operating temperature of the glass tube, so that the electrodes are sealed in the sealing parts.

Therefore, the electrodes can be sealed easily in the sealing parts of the glass tube.

Also, a low-pressure mercury lamp relating to the present invention includes the above arc tube of the present invention.

Therefore, the total length of the arc tube can be shortened, thereby enabling the total length of the mercury lamp to be shortened.

Further, in the low-pressure mercury lamp, an overall size of the arc tube may be such that an outer diameter is in a range of 34 mm to 40 mm and a length is in a range of 50 mm to 90 mm.

Therefore, by applying the present invention for example to a compact self-ballasted fluorescent lamp, the compact self-ballasted fluorescent lamp can have substantially the same size as the size of an incandescent lamp. Such a compact self-ballasted fluorescent lamp therefore can be used in a lighting apparatus designed for an incandescent lamp.

On the other hand, the low-pressure mercury lamp may include a globe that covers the arc tube, and the arc tube may be thermally connected to the globe via a heat-conductive member.

Therefore, an increase in the temperature of the arc tube in a steady lighting state can be reduced.

Also, in the low-pressure mercury lamp, a maximum outer diameter of the globe may be 60 mm or less.

Therefore, by applying the present invention for example to a compact self-ballasted fluorescent lamp, the compact self-ballasted fluorescent lamp can have substantially the same size as the size of an incandescent lamp. Such a compact self-ballasted fluorescent lamp therefore can be used in a lighting apparatus designed for an incandescent lamp.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings.

DESCRIPTION OF THE PREFERRED EMBODIMENT

The following describes, with reference to the drawings, a preferred embodiment of the present invention relating to a low-pressure mercury lamp, which is applied to a compact self-ballasted fluorescent lamp.

1. Construction of Compact Self-Ballasted Fluorescent Lamp

Figure 1:
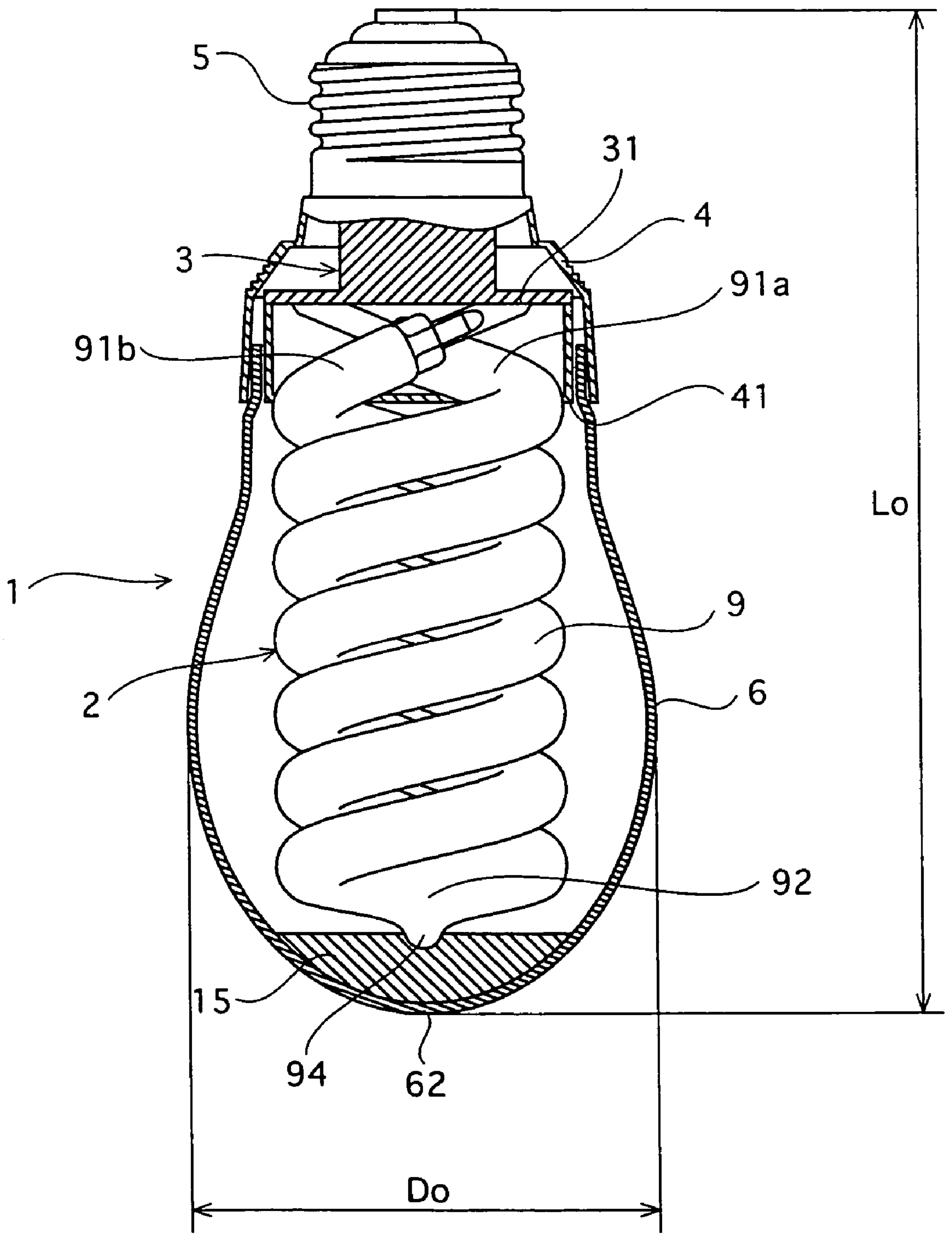
FIG. 1 is a front view showing the overall construction of a compact self-ballasted fluorescent lamp relating to an embodiment of the present invention, with being partially cut away.

FIG. 1 is a front view showing the overall construction of the compact self-ballasted fluorescent lamp relating to the present invention, with being partially cut away. The compact self-ballasted fluorescent lamp 1 is a 21 W lamp that is an alternative to a 100 W incandescent lamp. It should be noted here that a 100 W incandescent lamp has a maximum outer diameter of 60 mm and a total length of 110 mm.

As shown in the figure, the compact self-ballasted fluorescent lamp 1 includes an arc tube 2 that is wound in a double spiral, an electronic ballast 3 for lighting the arc tube 2, a case 4 containing the electronic ballast 3 and having a base 5, and a globe 6 covering the arc tube 2.

The arc tube 2 extends from the opening of the case 4 in the downward direction (in the direction opposite to the base 5). A glass tube 9 forming the arc tube 2 is turned at its substantially middle to form a turning part 92, so that end parts 91*a* and 91*b* of the glass tube 9 are positioned within the case 4. Electrodes are attached in the end parts 91*a* and 91*b* of the glass tube 9 (see FIG. 2). Mercury is enclosed, for example singly, within the glass tube 9.

The arc tube 2 is held by a holder 41 via an adhesive such as silicone (not shown), with the end parts 91*a* and 91*b* being placed within the holder 41. A substrate 31 is attached at the backside of the holder 41 (at the side where the base 5 is provided). Electronic components for lighting the arc tube 2 are attached to the substrate 31. It should be noted here that these electronic components form the electronic ballast 3. This electronic ballast 3 employs a series inverter method, and its circuit efficiency is 91%.

The case 4 is made of a synthetic resin and is in a tubular shape having a larger diameter as closer to its bottom end. The holder 41 is placed in the opening of the case 4, so that the side of the holder 41 where the electronic ballast 3 is provided (the upper side) is positioned back within the case 4. A peripheral part of the holder 41 is fixed to the inner wall of the case 4 via an adhesive (not shown). The E26 type base 5 is attached to the top end of the case 4, which is the opposite side to the opening of the case 4. It should be noted here that electrical connection between the base 5 and the electronic ballast 3 is not shown in FIG. 1.

The globe 6 is provided to cover the arc tube 2. The opening of the globe 6 is set in the opening of the case 4, and the end of the globe 6 at the opening side is fixed to the inner wall of the case 4 via an adhesive. The globe 6 and the case 4 constitute an envelope. The total length "$L_0$" of the compact self-ballasted fluorescent lamp 1 is 115 mm.

As is the case with a bulb used for an incandescent lamp, the globe 6 is made from a glass material having a high flexibility in its design, and is in the "A" shape. The maximum outer diameter "$D_0$" of the globe 6 is 60 mm.

A bottom end 62 of the globe 6 at its inner wall and a bottom end of the arc tube 2 are thermally connected with each other via a heat-conductive member 15 made of transparent silicone. With this construction, even if the temperature of the arc tube 2 increases when the compact self-ballasted fluorescent lamp 1 is lit, heat in the arc tube 2 is conducted to the globe 6 via the heat-conductive member 15. Accordingly, an increase in the temperature of the arc tube 2, in particular an increase in the temperature of the bottom end of the arc tube 2 can be reduced.

The following are the reasons why an increase in the temperature of the bottom end of the arc tube 2 can be reduced. A mercury vapor pressure in the arc tube 2 can be effectively decreased by lowering the temperature of the coolest part 94 of the arc tube 2. In the case of the double-spiral arc tube 2 relating to the present embodiment, a part of the arc tube 2 that is the most distant from the electrodes, i.e., the bottom end of the arc tube 2, is the coolest part 94 of the arc tube 2.

It should be noted here that this coolest part 94 corresponds to the central portion of the turning part 92 of the glass tube 9. The central portion of the turning part 92 is formed to swell toward the heat-conductive member 15, so as to increase an area of its contact with the heat-conductive member 15.

Figure 2:
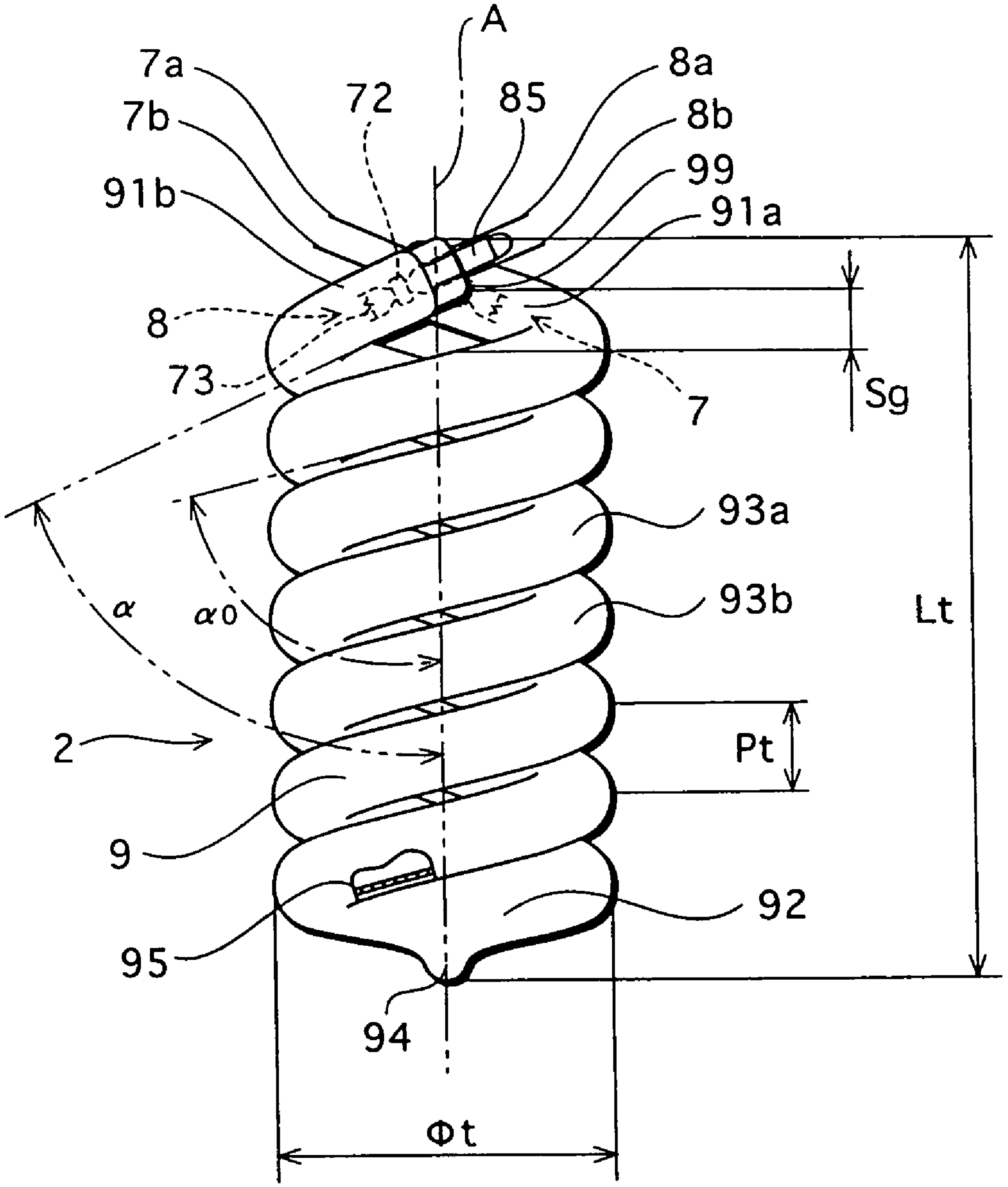
FIG. 2 is a front view showing the construction of an arc tube relating to the embodiment, with being partially cut away.

FIG. 2 is a front view showing the construction of the arc tube 2, with partially being cut away.

The glass tube 9 has a double-spiral structure that is made up of the turning part 92, a first spiral part 93*a*, and a second spiral part 93*b*. The first spiral part 93*a* starts from one end (e.g., the end part 91*a*) of the glass tube 9 and is spirally wound around the axis "A" (spiral axis) toward the turning part 92 provided at the bottom end of the arc tube 2 in the figure. The second spiral part 93*b* starts from the turning part 92 and is spirally wound around the spiral axis "A" toward the other end (the end part 91*b*) of the glass tube 9. The first and second spiral parts 93*a* and 93*b* together form about 6.5 spirals around the spiral axis "A". The outer diameter "101 *t*" of the arc tube 2 is 38 mm.

The first and second spiral parts 93*a* and 93*b* of the glass tube 9 are each spirally wound around the spiral axis "A" at a predetermined angle "$\alpha_0$" (about 78° in the present embodiment) with respect to the spiral axis "A". The first and second spiral parts 93*a* and 93*b* keep a substantially fixed distance from the spiral axis "A". In terms of a plane perpendicular to the direction of the spiral axis "A", the glass tube 9 is viewed in the shape of a concentric circle with the spiral axis "A" being the center. It should be noted here that the fixed distance between the tube axis of the glass tube 9 and the spiral axis "A" may be hereafter referred to as a "spiral radius".

Also, a pitch "Pt" of adjacent spirals of the first spiral part 93*a* and the second spiral part 93*b* in the direction of the spiral axis "A" (hereafter a "spiral pitch") is 10 mm. The spiral pitch specifically is a distance between the center of a cross section of the first spiral part 93_a_ (the tube axis of the glass tube) and the center of a cross section of the second spiral part 93_b_ (the tube axis of the glass tube). A gap between adjacent spirals of the first spiral part 93_a_ and the second spiral part 2 is about 1 mm.

On the other hand, the end parts 91_a_ and 91_b_ of the glass tube 9 are also spirally wound around the spiral axis "A", in such a manner that the spiral pitch in the end parts 91_a_ and 91_b_ gradually increases. A distance "Sg" between each end face 99 of the glass tube 9 (only the end face of the end part 91_a_ is shown in the figure) and a spiral adjacent to the end face 99 in the direction of the spiral axis "A" is about 5 mm.

To be more specific, the end parts 91_a_ and 91_b_ of the glass tube 9 are each bent in the spiral axis direction opposite to the turning part 92, at a position away from the end face 99 in the winding direction (i.e., the direction in which a wound spiral extends) by a distance corresponding to about ¼ of one spiral. An area including this position at which each of the end parts 91_a_ and 91_b_ is bent is hereafter referred to as a "bent area". With such a bent area provided in each of the end parts 91_a_ and 91_b_ of the glass tube 9, the spiral pitch gradually increases from the bent area toward the end face 99.

The end parts 91_a_ and 91_b_ of the glass tube 9 are at a predetermined angle "α" with respect to the spiral axis "A" (about 70° in the present embodiment). It should be noted here that the total length "Lt" of the arc tube 2 is about 80 mm.

As a material for the glass tube 9, soft glass such as strontium-barium silicide glass (with a softening point of 682° C. and an operating temperature of 1020° C.) is used. The glass tube 9 has a tube inner diameter of 7.4 mm and a tube outer diameter of 9.0 mm.

In the end parts 91_a_ and 91_b_ of the glass tube 9, electrodes 7 and 8 are sealed. As the electrodes 7 and 8, filament coils 73 made of tungsten are used. These electrodes 7 and 8 are placed within the glass tube 9 in a state where they are temporarily fixed via bead glass 72 (by way of a "bead glass mounting method"). Lead wires 7_a_, 7_b_, 8_a_, and 8_b_ for the electrodes 7 and 8 are sealed into the end parts 91_a_ and 91_b_ of the glass tube 9. This construction enables the glass tube 9 to be hermetically sealed.

It should be noted here that an exhaust tube 85 for exhausting the inside the glass tube 9 is attached to one end of the glass tube 9 (here, the end part 91_b_) together with the electrode 8 being sealed therein. The distance between the electrodes 7 and 8 (the inter-electrode distance) within the glass tube 9 is 670 mm.

Within the glass tube 9, mercury is singly enclosed by an amount of about 5 mg, and also, a rare gas such as a mixture gas of argon and neon (with a capacity ratio of neon in the mixture gas being about 25%) is enclosed at 400 Pa via the exhaust tube 85.

Here, mercury to be enclosed within the glass tube 9 should be in such a form that can exhibit, at the time of lighting operation, a mercury vapor pressure value exhibited by mercury singly enclosed within the glass tube 9. As one example, a mercury-zinc alloy may be enclosed within the glass tube 9.

Here, a rare-earth phosphor 95 is applied to the inner surface of the glass tube 9. The phosphor 95 used here is a mixture of three types of phosphors respectively emitting red, green, and blue light, e.g., $Y_2O_3$:Eu, $LaPO_4$:Ce, Tb, and $BaMg_2Al_{16}O_{27}$:Eu, Mn.

The following describes lighting performances of the compact self-ballasted fluorescent lamp 1. First, when the compact self-ballasted fluorescent lamp 1 is lit in a steady lighting state with the base 5 being oriented upward, the luminous flux is 1520 lm, and the luminous efficiency is 70 lm/W or higher.

The reasons for such a high luminous efficiency of 70 lm/W or higher can be considered as follows. The coolest part 94 of the arc tube 2 and the bottom end 62 of the globe 6 at its inner wall are thermally connected with each other via the heat-conductive member 15. Therefore, the temperature of the coolest part 94 of the arc tube 2 in a steady lighting state can be made substantially the same as such a temperature that corresponds to a mercury vapor pressure at which mercury within the glass tube 9 achieves the maximum luminous flux. Also, the luminous flux rising characteristics of the compact self-ballasted fluorescent lamp 1 at the lamp startup are improved due to its singly enclosed mercury, as compared with compact self-ballasted fluorescent lamps in which mercury in an amalgam form is used.

2. Manufacturing Method for Arc Tube

1) Forming Glass Tube into Double Spiral

Figure 3C:
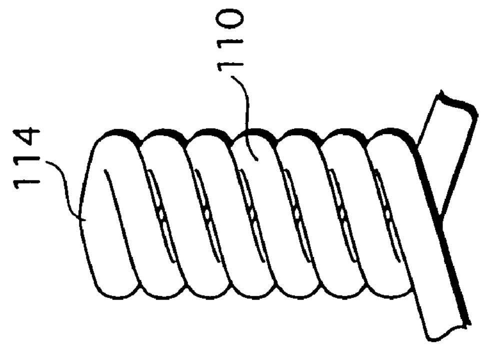
FIGS. 3A to 3C show manufacturing processes of the arc tube relating to the embodiment.
Figure 3B:
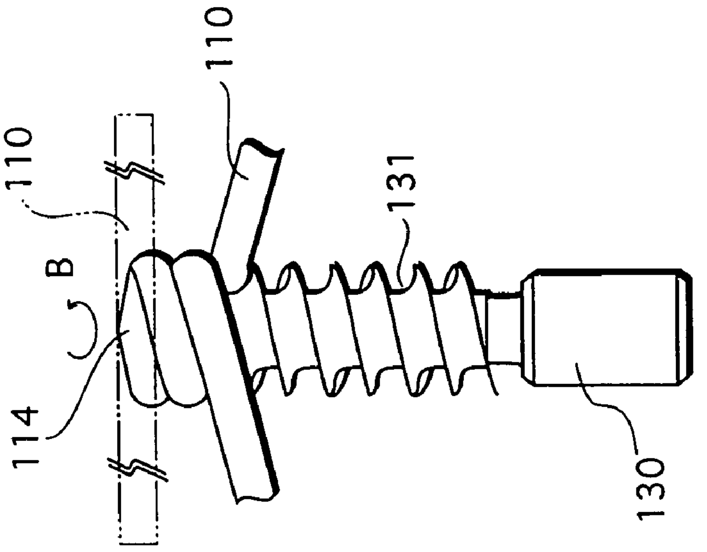
Figure 4C:
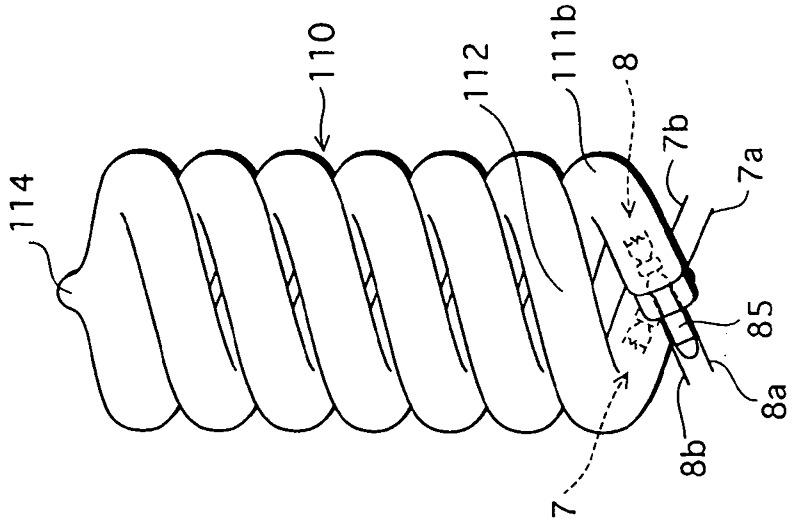
FIGS. 4A to 4C show manufacturing processes of the arc tube relating to the embodiment.
Figure 4B:
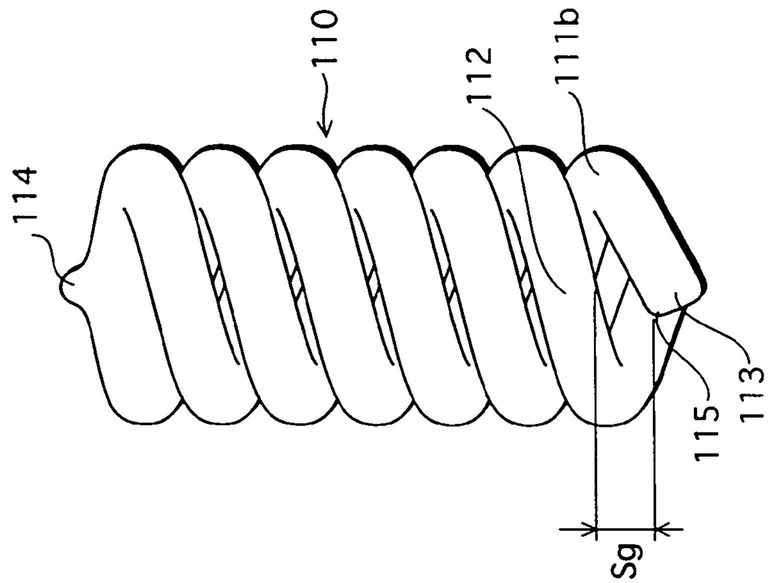
Figure 4A:
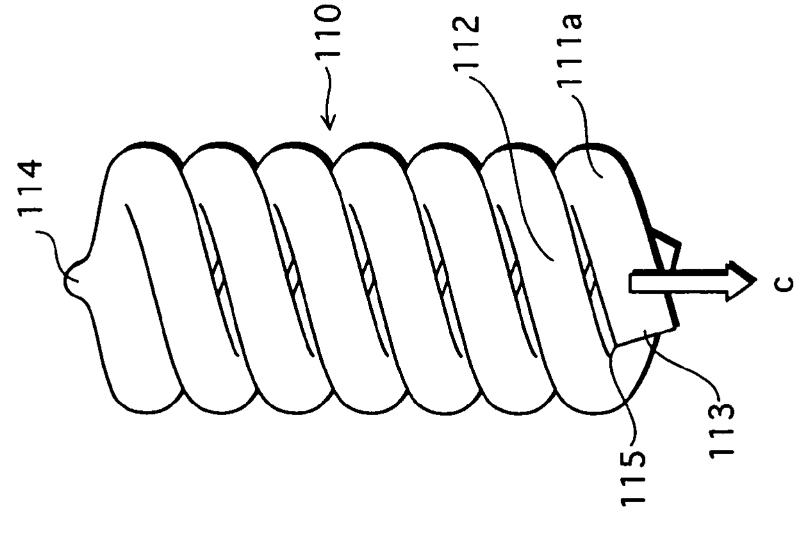
Figure 5:
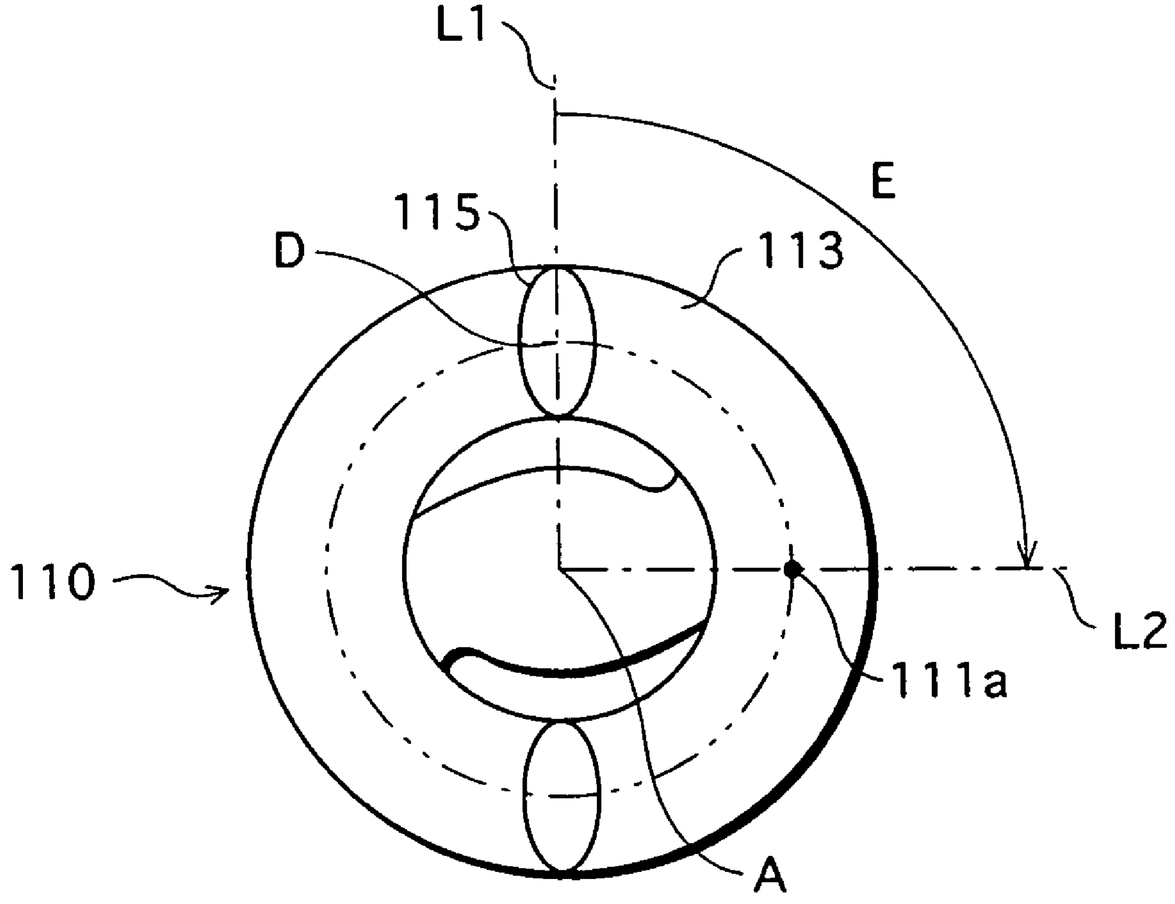
FIG. 5 shows a glass tube in the state shown in FIG. 4A, as viewed from end parts of the glass tube in the direction of its spiral axis.

The following describes a method for winding the glass tube 110 into a double spiral. FIGS. 3A to 3C and 4A to 4C are drawings for explaining the manufacturing processes of the double-spiral arc tube. FIG. 5 shows the glass tube in the state shown in FIG. 4A, as viewed from the end parts of the glass tube in the direction of the spiral axis "A".

(i) Process of Softening Glass Tube

Figure 3A:
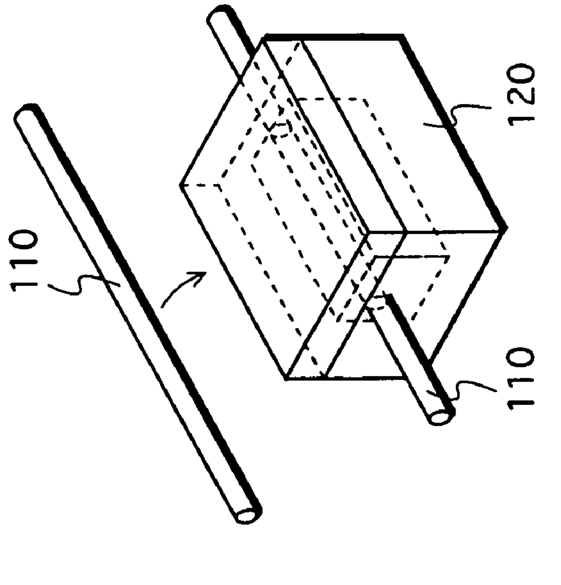

First, the glass tube 110 that is straight is set as shown in FIG. 3A. The glass tube 110 has a circular cross section, and a tube inner diameter of 7.4 mm and a tube outer diameter of 9.0 mm. A middle part of the glass tube 110 (at least including a part of the glass tube 110 to be wound into a double spiral) is heated within an electric or gas furnace 120 as shown in FIG. 3A. The glass tube 110 is heated to a temperature equal to or higher than a softening point of the glass tube 110 (675° C. in the present embodiment), so that the glass tube 110 is softened.

(ii) Process of Winding and Removing Glass Tube

The softened glass tube 110 is taken out of the furnace 120, and is placed on a mandrel 130 in such a manner that its substantially middle part 114 is aligned with the top of the mandrel 130 as shown in FIG. 3B. Then, the mandrel 130 is rotated using a driving device (not shown) (in direction "B" in the figure). This results in the softened glass tube 110 being wound around the mandrel 130. The substantially middle part 114 of the glass tube 110 is formed into a turning part, which is also given reference numeral 114 for ease of explanation.

At the outer circumference of the mandrel 130, a groove 131 is formed to be wound around the axis of the mandrel (=spiral axis) in a double spiral, with its spiral pitch being 10 mm in the direction of the axis of the mandrel. By rotating this mandrel 130, the softened glass tube 110 is spirally wound up along the groove 131. During the winding of the glass tube 110 around the mandrel 130, a gas such as nitrogen whose pressure is controlled is being blown into the glass tube 110 so as to retain a cross section of the glass tube 110 in a substantially circular shape.

The glass tube 110 is left in a state of being wound around the mandrel 130 for a while, so as to be cooled down. With being cooled down, the glass tube 110 returns from its softened state to a hardened state. Then, the mandrel 130 is rotated in the direction opposite to the winding rotation direction (direction "B"), so that the glass tube 110 can be removed from the mandrel 130. The glass tube 110 removed from the mandrel 130 has a double-spiral structure as shown in FIG. 3C.

(iii) Process of Cutting Glass Tube

An unnecessary part of the glass tube 110 removed from the mandrel 130 is cut, in such a manner that the number of spirals of the glass tube 110 becomes 6.5. At this stage, the glass tube 110 has a double-spiral structure in which the spiral pitch is 10 mm uniformly from the turning part 114 to the end part 113 (see FIG. 4A).

(iv) Process of Further Spacing End Parts

An area at which the end part 113 of the cut glass tube 110 is to be bent is heated, for example, using a gas burner. The area at which the end part 113 is to be bent is at the position away from an end face 115 of the end part 113 in the winding direction (i.e., the direction in which a wound spiral extends) by a distance corresponding to about ¼ of one spiral. Such an area is hereafter referred to as a "bent-formation area". As shown in FIG. 4A, after the bent-formation area is heated, the end part 113 of the glass tube 110 is pulled in direction "C", which is the direction of the spiral axis "A". By doing so, the end part 113 is further spaced from a spiral adjacent to the end part 113 (hereafter simply referred to as an "adjacent spiral" 112) so that ihe distance between the end face 115 and the adjacent spiral 112 (specifically, the distance between the end face 115 and the outer circumference of the adjacent spiral 112 in the direction of the spiral axis "") becomes 5 mm as shown in FIG. 4B.

As FIG. 5 shows the glass tube 110 in the state in FIG. 4A viewed from the end part 113 of the glass tube 110 in the direction of the spiral axis "A", the bent-formation area 111*a* is provided at a position away from the end face 115 of the end part 113 (the same being applied to the other end part) in the direction where the turning part is provided, by a distance corresponding to about ¼ of one spiral. In other words, the bent-formation area 111*a* is provided at such a position that the line "L1" and the line "L2" form an angle of about 90°. The line "L1" is a line liking the tube axis "D" of the end part 115 and the spiral axis "A". The line "L2" is a line linking the spiral axis "A" and the bent-formation area 111*a*.

As described above, the bent-formation area 111*a* is formed into a "bent area 111*b*".

At the time of the spacing, the entire end part 113 of the glass tube 110 extending from its end face 115 to the bent-formation area 111*a* is not heated, but only the bent-formation area 111*a* is locally heated to a temperature about 100° C. higher than a softening point of the glass tube 110 (i.e., about 775° C.).

The spiral 112 adjacent to the bent-formation area 111*a* is close to the bent-formation area 111*a* with a gap between them being as small as 1 mm. However, with the bent-formation area 111*a* being heated to 775° C., the temperature of the adjacent spiral 112, even if it increases, does not reach a temperature higher than the softening point of the glass tube 110. Therefore, thermal deformation of the adjacent spiral 112 does not occur.

Moreover, the end face 115 of the glass tube 110 is further spaced in the direction of the spiral axis "A" from the adjacent spiral 112 by about 5 mm. The bent area 111*b* is at such a position away from the end face 115 in the winding direction by a distance corresponding to ¼ of one spiral. Therefore, the bent-formation area 111*a* involves only a little bending in the direction of the spiral axis "A", with a residual stress being small in the bent area 111*b*. Due to this, annealing performed on the glass tube 110 that has been wound up into a double spiral can eliminate not only a residual stress therein but also a residual stress in the bent area 111*b*.

2) Process of Sealing Electrodes in Glass Tube

A phosphor is applied to the inner surface of the glass tube 110 that has been formed into a double spiral described above. Then, the electrodes 7 and 8 are sealed at both ends of the glass tube 110 (only the end part 113 is shown in FIG. 4). Although the following only describes a method for sealing the electrode 8 at the end part 113 of the glass tube 110, the same method is applied to sealing the electrode 7 at the other end of the glass tube 110.

First, the electrode 8 in which a filament coil 73 is supported by a pair of lead wires 8*a* and 8*b* with the bead glass mounting method is prepared. The electrode 8 is inserted in the end part 113 of the glass tube 110 in such a manner that the distance between the end face 115 and the top of the filament coil 73 is about 15 mm. With the electrode 8 being inserted therein together with the lead wires 8*a* and 8*b* in this way, the end part 113 is heated to a temperature about 100°C. higher than the operating temperature, i.e., 1120° C., using a gas burner. Then, when the end part 113 enters in a melted state, the end part 113 is pinched and sealed, together with the lead wires 8*a* and 8*b*.

Here, because the end face 115 of the glass tube 110 is spaced from the outer circumference of the adjacent spiral 112 by 5 mm, the adjacent spiral 112 is not heated to a high temperature when the end part 113 of the glass tube 110 is heated to 1120° C. for the purpose of sealing the electrode 8 therein. Therefore, the adjacent spiral 112 is prevented from being softened and deformed. Further, because the end part 113 of the glass tube 110 is spaced from the adjacent spiral 112 in the direction of the spiral axis "A", an enough work space for sealing the electrode 8 is provided, thereby enabling the operation of sealing the electrode 8 to be carried out efficiently.

The above-described processes complete the manufacture of the arc tube 2. It should be noted here that the exhaust tube 85 is sealed in the end part 113 of the glass tube 110 together with the electrode 8 being sealed in the end part 113. Via this exhaust tube 85, mercury and a rare gas are enclosed into the glass tube 110. It should be noted here that the end part 113 of the glass tube 110 corresponds to the end part 91*b* of the glass tube 9 in FIG. 2.

3. Others

1) Process of Further Spacing End Parts (i) Distance between End Face of Glass Tube and Adjacent Spiral In the present embodiment, the distance between the end face 115 of the glass tube 110 and the spiral 112 adjacent to the end face 115 in the direction of the spiral axis "A" is 5 mm. This distance may be set at any value in a range of 3 to 12 mm inclusive. If this distance is shorter than 3 mm, a gap between the end part 113 of the glass tube 110 and the adjacent spiral 112 becomes so narrow that an enough work space for inserting and sealing the electrode 8 into the end part 113 cannot be provided. Further, the adjacent spiral 112 may be thermally deformed or the like when the electrode 8 is heated for the purpose of being sealed.

On the other hand, if this distance is longer than 12 mm, a large work space for inserting and sealing the electrode 8 into the end part 113 of the glass tube 110 can be provided, but the total length "Lt" of the arc tube becomes as large as the total length of an arc tube of a conventional compact self-ballasted fluorescent lamp in which end parts of a glass tube are made parallel with its spiral axis.

(ii) Heating Temperature of Bent Area

The temperature to which the bent-formation area 111*a* is to be heated when the end part 113 of the glass tube 110 is further spaced from the adjacent spiral 112 is determined depending on a softening point of a material used for the glass tube 110. It is preferable that the heating temperature be equal to or higher than the softening point and lower than the operating temperature. It is further preferable that the heating temperature be equal to or lower than a temperature that is 120° C. higher than the softening point.

This is because the glass tube 110 to be softened for bending at the bent-formation area 111*a* cannot be bent smoothly when the temperature of the bent-formation area 111*a* is lower than the softening point.

On the other hand, although the glass tube 110 can enter in a softened state at a temperature higher than the operating temperature. With such a temperature, the viscosity of the glass tube 110 is lowered, thereby making it difficult to retain the shape of the glass tube 110. In this case, the workability is remarkably degraded. Although the bent-formation area 111*a* may be heated to a temperature that is 120° C. higher than the softening point for bending the glass tube 110 at the bent-formation area 111*a*, that requires a lot of energies, increases the cost, and takes a long time to achieve the temperature, thereby leading to deterioration in the production efficiency.

(iii) Position of Bent Area

It is preferable that the bent area 111*b* of the glass tube 110 be positioned between (a) the very top, in its insertion direction, of the electrode (i.e., the very top, in its insertion direction, of the filament coil 73) placed within the glass tube 110 and (b) a position away from the end face of the glass tube 110 in the winding direction by a distance corresponding to ½ of one spiral.

This is due to the following reason. If the bent area 110*b* is away from the end face 115 of the glass tube 110 by a distance shorter than a length of a part of the electrode 8 inserted in the glass tube 110 (about 15 mm in the present embodiment), the very top, in its insertion direction, of the filament coil 73 within the glass tube 110 may be contacted with the bent area 111*b*, or the filament coil 73 may be heated to a high temperature when the end part 113 of the glass tube 110 is heated. If these happen, an emitter applied on the top of the filament coil 73 may be vaporized.

On the other hand, if the bent area 111*b* is away from the end face 115 of the glass tube 110 by a distance longer than the distance corresponding to ½ of one spiral, the positional accuracy of the end part 113 in which the electrode 8 is sealed is degraded, thereby degrading the production efficiency in the process of sealing the electrode 8.

(iv) Process of Sealing Electrodes

The temperature at which the glass tube 110 is heated to seal the electrode 8 in the end part 113 of the glass tube 110 is determined based upon the operating temperature depending on a material used for the glass tube 110. It is preferable that the heating temperature be equal to or higher than the operating temperature, and be equal to or lower than a temperature that is 120° C. higher than the operating temperature.

This is due to the following reason. The glass tube 110 is melted to enable the electrode 8 to be sealed therein, and therefore, the electrode 8 cannot be sealed when the temperature of the glass tube 110 is lower than the operating temperature.

On the other hand, although the glass tube 110 may be heated to a temperature that is 120° C. higher than the operating temperature to seal the electrode 8 therein, that increases the cost, and also, requires a long time to achieve the temperature, thereby leading to deterioration in the production efficiency.

Modifications

Although the present invention is described based on the above embodiment, the contents of the present invention should not be limited to specific examples shown in the above embodiment. For example, the following modifications are possible.

1. Appearance of Globe of Arc Tube

Although the above embodiment describes the case where the compact self-ballasted fluorescent lamp includes the globe covering the arc tube, the present invention may be applied to a compact self-ballasted fluorescent lamp that does not include a globe. A compact self-ballasted fluorescent lamp without a globe is a little smaller than a compact self-ballasted fluorescent lamp including a globe. By applying the present invention to such a compact self-ballasted fluorescent lamp without a globe, an arc tube of the lamp can be further downsized in the direction of the spiral axis, and therefore, the total length of the compact self-ballasted fluorescent lamp can be shortened accordingly.

Further, in the case of a compact self-ballasted fluorescent lamp without an outer tube, the outer diameter of an arc tube of the lamp may have room for a little increase. By increasing the outer diameter of the arc tube, the inter-electrode distance can be made longer, thereby enabling the luminous efficiency of the lamp to be improved. Also, a compact self-ballasted fluorescent lamp without an outer tube may be formed to produce brightness equivalent to brightness produced by the corresponding incandescent lamp, with its total length being shorter than that of the incandescent lamp. With the application of the present invention, therefore, the flexibility in designing an arc tube, and further, the flexibility in designing a compact self-ballasted fluorescent lamp can be increased.

2. Process of Cutting and Removing Glass Tube

The above embodiment describes the case where in the arc tube manufacturing processes, an unnecessary part of the glass tube that has been formed into a double spiral is first cut, and then, the bent-formation area (an area away from the end face by a certain distance in the end part) is heated so that the bent area is formed, for the purpose of further spacing the end part of the glass tube from the adjacent spiral of the glass tube, and then a phosphor is applied to the inner surface of the glass tube. Alternatively, the bent-formation area 111*a* may first be heated so that the bent area is formed before the unnecessary part of the glass tube is cut, the unnecessary part of the glass tube may be cut, and then, the phosphor may be applied.

Alternatively, the bent-formation area 111*a* may be heated so that the bent area is formed after the glass tube is formed in a double spiral, the phosphor may be applied, and then the unnecessary part of the glass tube may be cut. In short, the electrode may be sealed into the end part of the glass tube after the bent area is formed.

It is preferable that a phosphor be applied after the glass tube is formed into the final shape of the arc tube. This is because the phosphor may be cracked or detached if the glass tube in which the phosphor has been already applied is bent. This cracking or detaching of the phosphor is particularly remarkable when the outer diameter of the double spiral shape is small. In the case of the size of the arc tube in the above embodiment, it is preferable that the glass tube not be bent after the phosphor is applied thereto.

3. Material for Arc Tube

The above embodiment describes the case where strontium-barium silicide glass is used as a material for the glass tube, but other materials may be used for the glass tube. For example, soda lime glass (with a softening point of 690° C.

and an operating temperature of 1005° C.), lead glass (with a softening point of 615° C. and an operating temperature of 955° C.), and barium silicide glass (with a softening point of 683° C. and an operating temperature of 1031° C.) may be used as a material for the glass tube.

4. Gap between Adjacent Spirals

The above embodiment describes the case where a gap between adjacent spirals of the fist spiral part and the second spiral part is 1 mm. However, this gap may set at any value in a range of 0.5 mm or more and less than 3 mm.

This range of values for the gap is determined for the following reason. It is difficult to form the glass tube into a double spiral to have a gap between adjacent spirals being smaller than 0.5 mm. On the other hand, with the gap being 3 mm or more, widening the gap between the end part of the glass tube and the adjacent spiral becomes unnecessary.

5. Tube Diameter of Glass Tube and Outer Diameter of Arc Tube

The above embodiment describes the case where the tube inner diameter of the glass tube is 7.4 mm. However, a glass tube having a tube inner diameter of any value in a range of 5 to 9 mm inclusive may be used. If the tube inner diameter is smaller than 5 mm, it is difficult to insert an electrode in the glass tube. On the other hand, if the tube inner diameter is larger than 9 mm, the lamp cannot have brightness and size equivalent to those of the corresponding incandescent lamp.

It is preferable the overall size of the arc tube be such that its outer diameter is in a range of 34 to 40 mm and its length is in a range of 50 to 90 mm. This is due to the following reason. In the case where the arc tube of the present invention is used in a compact self-ballasted fluorescent lamp as an alternative to an incandescent lamp, the arc tube having an outer diameter larger than 40 mm and a length larger than 90 mm is larger than the incandescent lamp, whereas the arc tube having an outer diameter smaller than 34 mm and a length smaller than 50 mm fails to produce the luminous flux equivalent to the luminous flux produced by the incandescent lamp.

In short, a compact self-ballasted fluorescent lamp in which an arc tube with the overall size specified above can have substantially the same size as the size of an arc tube of an incandescent lamp and can produce the luminous flux substantially equivalent to the luminous flux produced by the incandescent lamp. Therefore, such a compact self-ballasted fluorescent lamp can be used in an existing lighting apparatus designed for an incandescent lamp.

6. Method for Attaching Electrodes

The above embodiment describes the case where the electrode is attached in the end part of the glass tube by way of sealing. However, the electrode may be attached therein by other methods. For example, a stem method of using a stem tube to which an electrode is attached may be employed.

7. End Parts of Glass Tube

The above embodiment describes the case where the spiral pitch of the glass tube is increased in both the ends parts of the glass tube. However, for example, the spiral pitch of the glass tube may be increased only in one of the end parts of the glass tube.

In this case, if the other end of the glass tube is formed to be parallel with the spiral axis, the arc tube cannot be downsized in the direction of the spiral axis. However, by bending the other end part of the glass tube not in parallel with the spiral axis but in the inward direction (so as to be close to the spiral axis) as described above with reference to the second conventional technique, the arc tube can be downsized in the direction of the spiral axis. In this case of the one end part of the glass tube being wound around the spiral axis and the other end of the glass tube being bent inward with respect to the direction of the spiral axis, each end part can provide therein a larger work space for attaching an electrode.

8. Bent Area

The above embodiment describes the case where one bent area at which the glass tube is bent in the spiral axis direction opposite to the turning part is provided at the position away from the end face of the glass tube in the winding direction by a distance corresponding to about ¼ of one spiral. However, two or more bent areas may be provided.

To be more specific, the spiral pitch in the end parts of the glass tube may be set to increase in such a manner that a gap between each end part of the glass tube and a spiral adjacent to the end part in the spiral axis direction is widened toward the end face of each end part in a step-by-step manner. With such a plurality of bent areas being provided, too, the same effects as produced in the above embodiment can be produced. The two or more bent areas are also to be provided each at a position between (a) the very top, in its insertion direction, of the electrode placed within the glass tube and (b) the position away from the end face of the glass tube in the winding direction by a distance corresponding to ½ of one spiral.

9. Others

Although the above embodiment describes the compact self-ballasted fluorescent lamp corresponding to a 100 W incandescent lamp, the present invention can of course be applied to other compact self-ballasted fluorescent lamps corresponding to a 40 W incandescent lamp and a 60 W incandescent lamp. In the case of such other lamps, the total length of an arc tube, i.e., the number of spirals of a glass tube, is changed accordingly.

10. Low-Pressure Mercury Lamp

Figure 6:
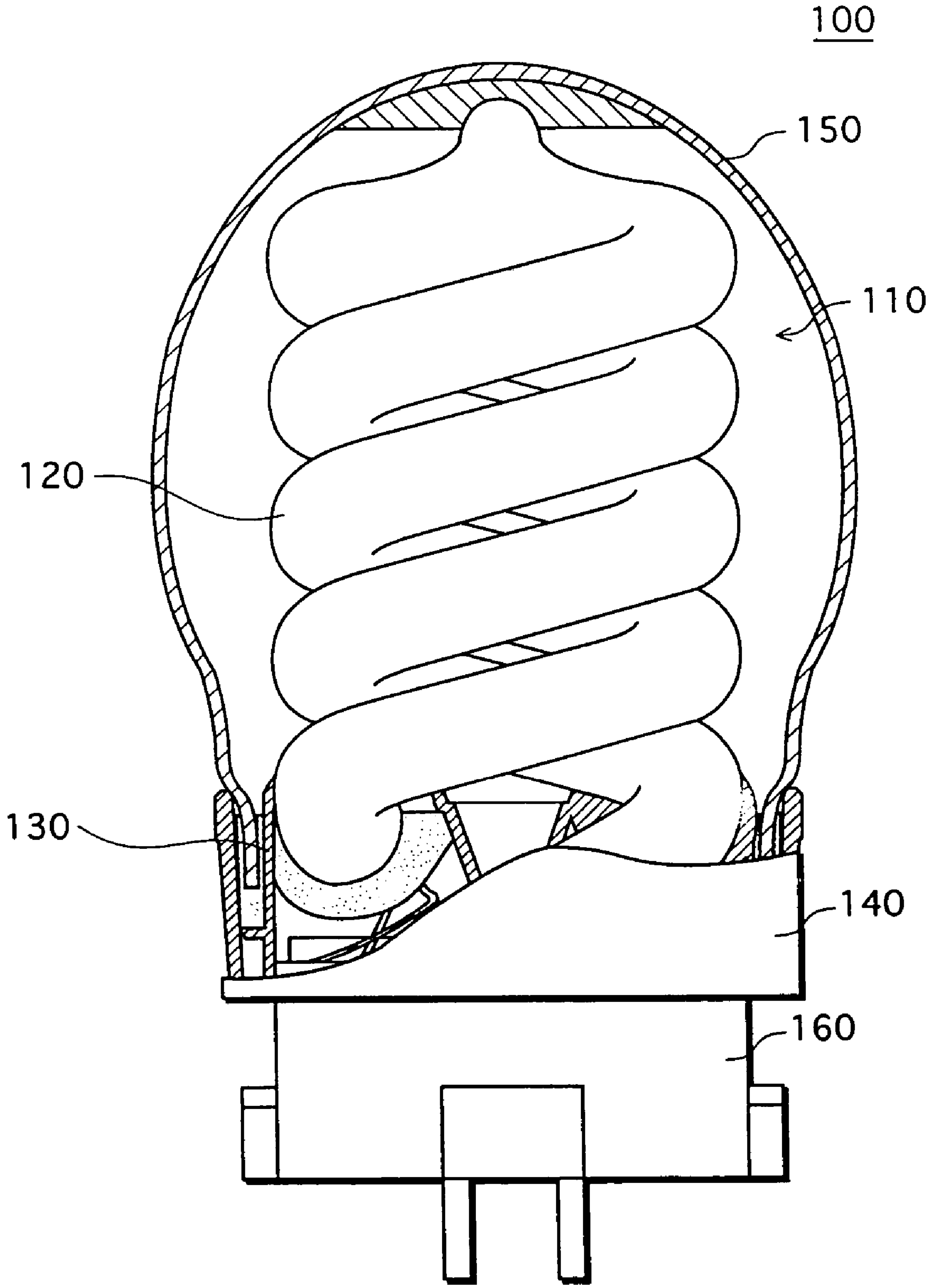
FIG. 6 shows a fluorescent lamp to which the present invention is applied.

Although the above embodiment describes the compact self-ballasted fluorescent lamp as the low-pressure mercury lamp of the present invention, the present invention can of course be applied to other lamps, one example of which is a fluorescent lamp shown in FIG. 6.

The fluorescent lamp 100 shown in FIG. 6 includes an arc tube 110, a holding member 130, a case 140, a globe 150, and a single base 160. The arc tube 110 has a double-spiral structure in which a glass tube 120 is wound into a double spiral toward its both ends. The holding member 130 is in a cylindrical shape having a bottom and holds the arc tube (specifically, both ends of the glass tube 120). The case 140 contains the holding member 130 at its inner wall. The globe 150 covers the arc tube 110. The single base 160 is set in a socket of a lighting apparatus to be supplied with electricity (e.g., a GX10q-type base).

The fluorescent lamp 100 differs from the compact self-ballasted fluorescent lamp 1 described in the above embodiment in that the electric ballast is not contained in the holding member 130 and the case 140, and in that the base 160 is not a screw-type base used for general compact self-ballasted lamps.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A manufacturing method for an arc tube formed by turning a glass tube at a substantially middle thereof and winding the glass tube from the middle to both ends thereof around an axis to form a double spiral, and sealing a pair of electrodes at both the ends of the glass tube, the manufacturing method comprising the steps of:

winding the glass tube that is softened by heating, along a groove in a double spiral formed on an outer circumference of a mandrel;

removing the glass tube that is wound in a double spiral from the mandrel;

making a pitch of (a) a spiral part in a vicinity of a sealing part at each end of the glass tube and (b) an adjacent spiral part in a direction of the axis, larger than a pitch of other adjacent spiral parts, to widen a gap between the sealing part and the adjacent spiral part; and pinch-sealing the electrodes in the sealing parts at both the ends of the glass tube.

2. The manufacturing method of claim 1, wherein in the step of making the pitch of the spiral part in the vicinity of the sealing part larger than the pitch of other adjacent spiral parts, a part of the glass tube away from an end face of the sealing part in a winding direction by a predetermined amount of spiral is heated to a temperature that is higher than a softening point of the glass tube and lower than an operating temperature of the glass tube, and the heated part of the glass tube is bent in the direction of the axis so that a gap between the spiral part in the vicinity of the sealing part and the adjacent spiral part widens gradually from the heated part toward the sealing part.

3. The manufacturing method of claim 1, wherein in the step of sealing the electrodes, the sealing parts of the glass tube are heated to a temperature that is equal to or lower than a temperature 120° C. higher than an operating temperature of the glass tube, so that the electrodes are sealed in the sealing parts.

4. The manufacturing method of claim 1, wherein in the winding step, the glass tube is wound, while a gas whose pressure is controlled is blown into the glass tube.

5. A manufacturing method for an arc tube formed by turning a glass tube at a substantially middle thereof and winding the glass tube from the middle to both ends thereof around an axis to form a double spiral, and sealing a pair of electrodes at both the ends of the glass tube, the manufacturing method comprising the steps of:

winding the glass tube that is softened by heating, along a groove in a double spiral formed on an outer circumference of a mandrel;

removing the glass tube that is wound in a double spiral from the mandrel;

making a pitch of (a) a spiral part in a vicinity of a sealing part at each end of the glass tube and (b) an adjacent spiral part in a direction of the axis, larger than a pitch of other adjacent spiral parts, to widen a gap between the sealing part and the adjacent spiral part, by heating a part of the glass tube away from an end face of the sealing part in a winding direction by a predetermined amount of spiral to a bending temperature that is higher than a softening point of the glass tube and lower than an operating temperature of the glass tube, and bending the heated part of the glass tube in the direction of the axis; and sealing the electrodes in the sealing parts at both the ends of the glass tube.

6. The manufacturing method of claim 5, wherein the bending temperature is equal to or lower than a temperature 120° C. higher than the softening point.

7. The manufacturing method of claim 5, wherein in the winding step, the glass tube is wound, while a gas whose pressure is controlled is blown into the glass tube.

8. A manufacturing method for an arc tube formed by turning a glass tube at a substantially middle thereof and winding the glass tube from the middle to both ends thereof around an axis to form a double spiral, and sealing a pair of electrodes at both the ends of the glass tube, the manufacturing method comprising the steps of:

winding the glass tube that is softened by heating, along a groove in a double spiral formed on an outer circumference of a mandrel, while a gas whose pressure is controlled is blown into the glass tube;

removing the glass tube that is wound in a double spiral from the mandrel;

making a pitch of (a) a spiral part in a vicinity of a sealing part at each end of the glass tube and (b) an adjacent spiral part in a direction of the axis, larger than a pitch of other adjacent spiral parts, to widen a gap between the sealing part and the adjacent spiral part; and sealing the electrodes in the sealing parts at both the ends of the glass tube.

* * * * *